(12) United States Patent
Pani et al.

(10) Patent No.: US 10,039,065 B2
(45) Date of Patent: Jul. 31, 2018

(54) STATE TRANSITION PROCEDURE IN A WIRELESS NETWORK

(71) Applicant: InterDigital Patent Holdings, Inc., Wilmington, DE (US)

(72) Inventors: Diana Pani, Montreal (CA); Benoit Pelletier, Roxboro (CA); Christopher R. Cave, Dollard-des-Ormeaux (CA); Paul Marinier, Brossard (CA); Rocco DiGirolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/492,733

(22) Filed: Apr. 20, 2017

(65) Prior Publication Data

US 2017/0223645 A1 Aug. 3, 2017

Related U.S. Application Data

(63) Continuation of application No. 14/166,810, filed on Jan. 28, 2014, which is a continuation of application
(Continued)

(51) Int. Cl.
*H04W 52/38* (2009.01)
*H04W 76/27* (2018.01)
(Continued)

(52) U.S. Cl.
CPC .......... *H04W 52/38* (2013.01); *H04L 5/0053* (2013.01); *H04W 76/046* (2013.01); *H04W 76/27* (2018.02); *H04W 88/02* (2013.01)

(58) Field of Classification Search
CPC ... H04W 52/38; H04W 76/27; H04W 76/046; H04W 88/02; H04L 5/0053
See application file for complete search history.

(56) References Cited

U.S. PATENT DOCUMENTS 7,043,244 B1 * 5/2006 Fauconnier .......... H04W 36/18
370/331
7,068,636 B2 6/2006 Kuo
(Continued)

FOREIGN PATENT DOCUMENTS

| EA | 1 755 355 | 2/2007 |
| EP | 1 377 096 | 1/2004 |
| WO | 07/088486 | 8/2007 |

OTHER PUBLICATIONS

"Draft 1, minutes of the 59 bis TSG-RAN WG2 meeting (Shanghai, China Oct. 8-12, 2007)," 3GPP TSG-RAN WG2 Meeting#60, R2-075189, (Nov. 5-9, 2007).
(Continued)

*Primary Examiner* — Chandrahas B Patel
(74) *Attorney, Agent, or Firm* — Volpe and Koenig, P.C.

(57) ABSTRACT

A wireless transmit/receive unit (WTRU) may operate in a first state where the WTRU does not have configured physical channels and discontinuously monitors for pages and a second state where the WTRU has configured uplink physical channels. The WTRU may, in response to a signal, transition to the first state and store an identity and medium access control (MAC) information. The WTRU may reinitiate communication with a network using the stored identity and MAC information.

8 Claims, 14 Drawing Sheets

Related U.S. Application Data

No. 13/758,396, filed on Feb. 4, 2013, now Pat. No. 8,644,879, which is a continuation of application No. 13/425,742, filed on Mar. 21, 2012, now Pat. No. 8,369,886, which is a continuation of application No. 12/346,339, filed on Dec. 30, 2008, now Pat. No. 8,145,253.

(60) Provisional application No. 61/038,448, filed on Mar. 21, 2008, provisional application No. 61/019,150, filed on Jan. 4, 2008.

(51) Int. Cl.
    *H04L 5/00*      (2006.01)
    *H04W 76/04*     (2009.01)
    *H04W 88/02*     (2009.01)

(56) References Cited

U.S. PATENT DOCUMENTS

| | | | |
|---|---|---|---|
| 7,089,029 | B2 | 8/2006 | Cao et al. |
| 7,792,079 | B2 | 9/2010 | Choi et al. |
| 8,145,253 | B2 | 3/2012 | Pani et al. |
| 8,867,455 | B2 | 10/2014 | Sambhwani et al. |
| 2004/0179627 | A1 | 9/2004 | Ketchum et al. |
| 2005/0009527 | A1 | 1/2005 | Sharma |
| 2005/0176437 | A1 | 8/2005 | Mir |
| 2007/0060153 | A1 | 3/2007 | Torsner et al. |
| 2007/0230394 | A1 | 10/2007 | Wang et al. |

OTHER PUBLICATIONS

"Enhanced Uplink CELL_FACH State in FDD," 3GPP TSG-RAN #37, RP-070677, (Riga, Latvia, Sep. 11-14, 2007).
Ericsson, "Introduction of Improved L2 support for high data rates," 3GPP TSG-RAN WG2 Meeting #58, R2-072307 (May 7-11, 2007).
Motorola et al., "Optional Cell Update for Improving PoC Access Delay," 3GPP TSG RAN2#54, R2-062251 (Aug. 28-Sep. 1, 2006).
Nokia Corporation et al., "Contention Resolution with MAC-e," 3GPP TSG-RAN WG2 Meeting #60, R2-074624 (Nov. 5-9, 2007).
Nokia Corporation et al., "Resource assignment for E-DCH access in CELL_FACH state," 3GPP TSG-RAN WG2 Meeting #60, R2-074626, Jeju, Korea (Nov. 5-9, 2007).
Nokia Corporation et al., "Some open issues," 3GPP TSG-RAN WG2 Meeting #61, R2-081770 (Mar. 31-Apr. 4, 2008).
Nokia et al., "Applications of Enhanced Uplink for CELL_FACH State in FDD," 3GPP TSG-RAN WG1 Meeting #50bis, R1-074301, Shanghai, China (Oct. 8-12, 2007).
Nokia Siemens Networks et al., "Enhanced Uplink for CELL_FACH State in FDD," TSG-RAN #37 Meeting, RP-070677 (Sep. 11-14, 2007).
NSN et al., "Enhanced CELL_FACH state with E-DCH," 3GPP TSG-RAN WG3 Meeting #57bis, R3-071927 (Oct. 8-11, 2007).
NSN et al., "Enhanced Random Access with E-DCH," 3GPP TSG-RAN WG2 Meeting #59bis, R2-074010 (Oct. 8-11, 2007).
Qualcomm Europe, "L1/2 Aspects for enhanced UL for CELL_FACH," 3GPP TSG-RAN WG1 #50-bis, R1-074126 (Oct. 8-12, 1997).
Qualcomm Europe, "Layer 1/2 aspects for enhanced UL for CELL_FACH," 3GPP TSG-RAN WG2 #59bis, R2-074390, Shanghi, China (Oct. 8-12, 2007).
Rapporteur (CATT), "Work Plan for Conformance test aspects—1. 28Mcps TDD Enhanced Uplink—Status after RAN5#37," 3GPP TSG-RAN WG5 meeting#37, R5-073284 (Nov. 5-9, 2007).
TD Tech et al., "TDD E-DCH Non-scheduled resource deletion," 3GPP TSG-RAN3 Meeting #57, R3-071345 (Aug. 20-24, 2007).
Third Generation Partnership Project, "Technical Specification Group Radio Access Network; Physical layer procedures (FDD)" (Release 8), 3GPP TS 25.214 V8.0.0 (Dec. 2007).
Third Generation Partnership Project, Technical Specification Group Radio Access Network; Enhanced uplink; Overall description; Stage 2 (Release 7), 3GPP TS 25.319 V7.2.0 (Apr. 2007).
Third Generation Partnership Project, Technical Specification Group Radio Access Network; Enhanced uplink; Overall description; Stage 2 (Release 7), 3GPP TS 25.319 V7.3.0 (Oct. 2007).
Third Generation Partnership Project, Technical Specification Group Radio Access Network; Enhanced uplink; Overall description; Stage 2 (Release 7), 3GPP TS 25.319 V7.6.0 (Jun. 2008).
Third Generation Partnership Project, Technical Specification Group Radio Access Network; Enhanced uplink; Overall description; Stage 2 (Release 8), 3GPP TS 25.319 V8.3.0 (Sep. 2008).
Third Generation Partnership Project, "Technical Specification Group Radio Access Network; Physical layer procedures (FDD)" (Release 7), 3GPP TS 25.214 V7.6.0 (Sep. 2007).
Third Generation Partnership Project, "Technical Specification Group Radio Access Network; Physical layer procedures (FDD)" (Release 8), 3GPP TS 25.214 V8.4.0 (Dec. 2008).
Third Generation Partnership Project, "Technical Specification Group Radio Access Network; Radio Resource Control (RRC); Protocol Specification (Release 4)," 3GPP TS 25.331 V4.18.0 (Dec. 2007).
Third Generation Partnership Project, "Technical Specification Group Radio Access Network; Radio Resource Control (RRC); Protocol Specification (Release 4)," 3GPP TS 25.331 V4.20.0 (Dec. 2008).
Third Generation Partnership Project, "Technical Specification Group Radio Access Network; Radio Resource Control (RRC); Protocol Specification (Release 5)," 3GPP TS 25.331 V5.21.0 (Dec. 2007).
Third Generation Partnership Project, "Technical Specification Group Radio Access Network; Radio Resource Control (RRC); Protocol Specification (Release 5)," 3GPP TS 25.331 V5.23.0 (Dec. 2008).
Third Generation Partnership Project, "Technical Specification Group Radio Access Network; Radio Resource Control (RRC); Protocol Specification (Release 6)," 3GPP TS 25.331 V6.15.0 (Sep. 2007).
Third Generation Partnership Project, "Technical Specification Group Radio Access Network; Radio Resource Control (RRC); Protocol Specification (Release 6)," 3GPP TS 25.331 V6.20.0 (Dec. 2008).
Third Generation Partnership Project, "Technical Specification Group Radio Access Network; Radio Resource Control (RRC); Protocol Specification (Release 7)," 3GPP TS 25.331 V7.6.0 (Sep. 2007).
Third Generation Partnership Project, "Technical Specification Group Radio Access Network; Radio Resource Control (RRC); Protocol Specification (Release 7)," 3GPP TS 25.331 V7.10.0 (Sep. 2008).
Third Generation Partnership Project, "Technical Specification Group Radio Access Network; Radio Resource Control (RRC); Protocol Specification (Release 8)," 3GPP TS 25.331 V8.0.0 (Sep. 2007).
Third Generation Partnership Project, "Technical Specification Group Radio Access Network; Radio Resource Control (RRC); Protocol Specification (Release 8)," 3GPP TS 25.331 V8.4.0 (Sep. 2008).
Third Generation Partnership Project, "Technical Specification Group Radio Access Network; Medium Access Control (MAC) protocol specification (Release 8)," 3GPP TS 25.321 V8.3.0 (Sep. 2008).
Third Generation Partnership Project, "Technical Specification Group Radio Access Network; Medium Access Control (MAC) protocol specification (Release 7)," 3GPP TS 25.321 V7.10.0 (Sep. 2008).
Third Generation Partnership Project, "Technical Specification Group Radio Access Network; Medium Access Control (MAC) protocol specification (Release 7)," 3GPP TS 25.321 V7.6.0 (Sep. 2007).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

(56) References Cited

OTHER PUBLICATIONS

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Physical channels and mapping of transport channels onto physical channels (FDD) (Release 7)," 3GPP TS 25.211 V7.4.0 (Nov. 2007).
Third Generation Partnership Project, "Technical Specification Group Radio Access Network; Physical channels and mapping of transport channels onto physical channels (FDD) (Release 7)," 3GPP TS 25.211 V7.6.0 (May 2008).
Third Generation Partnership Project, "Technical Specification Group Radio Access Network; Physical channels and mapping of transport channels onto physical channels (FDD) (Release 8)," 3GPP TS 25.211 V8.3.0 (Dec. 2008).
Third Generation Partnership Project, "Technical Specification Group Radio Access Network; Radio Resource Control (RRC); Protocol Specification (Release 7)," 3GPP TS 25.331 V7.7.0 (Sep. 2007).
Third Generation Partnership Project, "Technical Specification Group Radio Access Network; Feasibility study on uplink enhancements for UTRA TDD; (Release 6)," 3GPP TR 25.804 V6.1.0 (Mar. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.30 (Dec. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.0.0 (Dec. 2007).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008).
Nokia Corporation et al., "Introduction of Enhanced Uplink in CELL_FACH in 25.331," 3GPP TSG-RAN WG2 Meeting #63, R2-084923, Jeju, Korea, (Aug. 18-22, 2008).
Nortel, "Power Setting for DL RS Power Boosting in 4-tx System," 3GPP TSG-RAN Working Group 1 Meeting #54, R1-083144, Jeju, Korea, (Aug. 18-22, 2008).

* cited by examiner

STATE TRANSITION PROCEDURE IN A WIRELESS NETWORK

CROSS REFERENCE TO RELATED APPLICATIONS

This application is a continuation of U.S. patent application Ser. No. 14/166,810 filed Jan. 28, 2014, which is a continuation of U.S. patent application Ser. No. 13/758,396 filed Feb. 4, 2013, which issued as U.S. Pat. No. 8,644,879 on Feb. 4, 2014, which is a continuation of U.S. patent application Ser. No. 13/425,742 filed Mar. 21, 2012 which issued as U.S. Pat. No. 8,369,886 on Feb. 5, 2013, which is a continuation of U.S. patent application Ser. No. 12/346,339 filed Dec. 30, 2008, which issued as U.S. Pat. No. 8,145,253 on Mar. 27, 2012, which claims the benefit of U.S. Provisional Application No. 61/038,448 filed Mar. 21, 2008, and No. 61/019,150 filed Jan. 4, 2008, the contents of which are hereby incorporated by reference herein.

FIELD OF INVENTION

This application is related to wireless communications.

BACKGROUND

FIG. 1 shows radio resource control (RRC) service states 100 of a Third Generation Partnership Project (3GPP) wireless transmit/receive unit (WTRU) with an enhanced uplink (UL) in a Universal Mobile Telecommunications System (UMTS). The WTRU may operate in several states depending on user activity. The following states have been defined for UMTS Terrestrial Radio Access (UTRA) radio resource control (RRC) connected mode: IDLE 110, CELL_DCH 120, CELL_FACH 130, URA_PCH 140, and CELL_PCH 150. Other states that the WTRU may transition to include a general packet radio service (GPRS) packet transfer mode 160, or a global system for mobile communications (GSM) connected mode 170. RRC state transitions are controlled by the network using radio network controller (RNC) parameters. In general the WTRU does not decide to perform state transitions by itself.

Based on WTRU mobility and activity while in UTRA RRC connected mode (i.e., in the CELL_DCH, CELL_FACH, URA_PCH or CELL_PCH state), the UMTS Terrestrial Radio Access Network (UTRAN) may direct the WTRU to transition between the states CELL_PCH, URA_PCH, CELL_FACH, and CELL_DCH. Communication between the WTRU and the UTRAN, known as user plane communication, is only possible while in the CELL_FACH state or the CELL_DCH state.

In the CELL_DCH state, a dedicated physical channel is allocated to the WTRU in the UL and the downlink (DL). This corresponds to continuous transmission and continuous reception in the WTRU, which can be demanding on user power requirements. The WTRU is known on a cell level according to its current active set. An active set is a set of radio links simultaneously involved in a specific communication service between the WTRU and the UTRAN. The WTRU may use dedicated transport channels, shared transport channels, or a combination of these transport channels.

A WTRU is in the CELL_FACH state if it has been assigned to use the common channels (i.e., forward access channel (FACH), random access channel (RACH)). In the CELL_FACH state, no dedicated physical channel is allocated to the WTRU, which allows for better power consumption, at the expense of a lower UL and DL throughput.

Downlink communication in the CELL_FACH state may be achieved through a shared transport channel (i.e., FACH) mapped to a shared common control physical channel (S-CCPCH). Downlink communication in the CELL_FACH state may also be achieved through a high speed downlink shared channel (HS-DSCH). The WTRU continuously monitors the FACH channel, carried over the S-CCPCH, or the HS-DSCH, in the DL. Uplink communication in the CELL_FACH state is achieved through a default common or shared transport channel (i.e., RACH) mapped to the RACH physical channel (PRACH), which the WTRU may use anytime according to the access procedure for that transport channel. The RACH channel is a contention based channel with a power ramp-up procedure to acquire the channel and to adjust transmit power. The position of the WTRU is known by the UTRAN on a cell level according to the cell where the WTRU last performed a cell update.

A characteristics of the CELL_FACH state includes being well-suited for applications requiring very low uplink throughput. Another characteristic of the CELL_FACH state includes being well-suited for signaling traffic, such as transmission of CELL UPDATE messages and URA UPDATE messages. Mobility in the CELL_FACH state is handled autonomously by the WTRU. The WTRU independently takes measurements and determines which cell to camp on. System information (SI), read from the broadcast channel (BCH), includes setup details for the uplink channel (RACH) and the downlink channels (FACH and HS-DSCH) to be used in the CELL_FACH state.

In the CELL_PCH state, no dedicated physical channel is allocated to the WTRU. The WTRU selects a paging channel (PCH), and uses discontinuous reception for monitoring the selected PCH via an associated page indicator channel (PICH). No UL activity is possible. The position of the WTRU is known by the UTRAN on a cell level according to the cell where the WTRU last performed a cell update in the CELL_FACH state.

In the URA_PCH state, no dedicated channel is allocated to the WTRU. The WTRU selects a PCH, and uses discontinuous reception for monitoring the selected PCH via an associated PICH. No UL activity is possible. The location of the WTRU is known on a UTRAN registration area (URA) level according to the URA assigned to the WTRU during the last URA update in the CELL_FACH state.

Recent 3GPP proposals have identified the possibility of using the enhanced dedicated channel (E-DCH) in the CELL_FACH state, also referred to as Enhanced RACH or E-RACH. The E-DCH was introduced in Release 6 of the 3GPP specifications to increase uplink throughput. The enhanced uplink operates on a request/grant principle. WTRUs send an indication of the requested capacity they require, while the network responds with grants to the requests. The grants are generated by a Node-B scheduler. Also, hybrid automatic repeat requests (HARQ) are used for physical layer transmissions. Further, new UL and DL channels were introduced in Release 6 to support the E-DCH. The new UL physical channels are the E-DCH dedicated physical control channel (E-DPCCH), which is used for control information, and the E-DCH dedicated physical data channel (E-DPDCH), which is used for user data. The new DL physical channels are the E-DCH absolute grant channel (E-AGCH) and E-DCH relative grant channel (E-RGCH), which are used for transmission of grants, and the E-DCH HARQ acknowledgement indicator channel (E-HICH), which is used for fast Layer 1 acknowledgement (ACK)/negative acknowledgement (NACK). The Node-B 220 may issue both absolute grants and relative grants.

Grants are signaled in terms of a power ratio. Each WTRU maintains a serving grant, which it may convert to a payload size. For Release 6, WTRU mobility is handled by the network through soft handover and the concept of active sets.

In a pre-Release 8 high speed packet access (HSPA) system, the WTRU may be signaled to transition between different states. The transition between different states is defined, in pre-Release 8, for systems without E-RACH. However, with the introduction of the E-DCH in the CELL_FACH state and Idle mode, there are issues that occur when the WTRU is transitioning between states such as handling of available E-DCH resources, physical channel procedures, and allowing fast and smoother transitions between different states. Currently, for example, when the WTRU transitions from the CELL_DCH state to the CELL_FACH state, all the resources are released because the previous CELL_FACH state did not support E-DCH reception. However, this behavior may not be desirable when the WTRU moves from the CELL_DCH state to the CELL_FACH state where the cell supports E-DCH transmissions.

Accordingly, a method and apparatus for performing WTRU state transition with E-RACH in HSPA systems are desired.

SUMMARY

A method and apparatus for performing state transition of a wireless transmit/receive unit (WTRU) which supports enhanced dedicated channel (E-DCH) in the CELL_FACH state is disclosed. Uplink data is transmitted via an E-DCH while operating in a CELL_FACH state. A radio resource control (RRC) signal, which includes a reconfiguration message, is received while the WTRU is assigned an E-DCH resource. A reconfiguration of the physical channels is performed according to the RRC reconfiguration message. A transition to a CELL_DCH state is performed and uplink data is transmitted in the CELL_DCH state, via the E-DCH. In-synch and out-of-synch parameters are reported.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

When referred to hereafter, the terminology "MAC-i", "MAC-is" or "MAC-i/is" refers to the medium access control (MAC) sub-layer that supports E-DCH transmission in the UL for the CELL_DCH state and the CELL_FACH state, and may include but is not limited to "MAC-e", "MAC-es" or "MAC-e/es" respectively.

The term "E-RACH" and "E-DCH in the CELL_FACH state" is used to describe a resource that is used by a WTRU for uplink contention-based access in HSPA+systems. E-RACH may also indicate a combination of a scrambling code, a channelization code, a timeslot, an access opportunity and a signature sequence, which are associated to uplink contention-based channels in future system architecture. E-RACH may also indicate the use of E-DCH in the CELL_FACH state, the CELL_PCH state, the URA_PCH state, or Idle mode.

Figure 1:
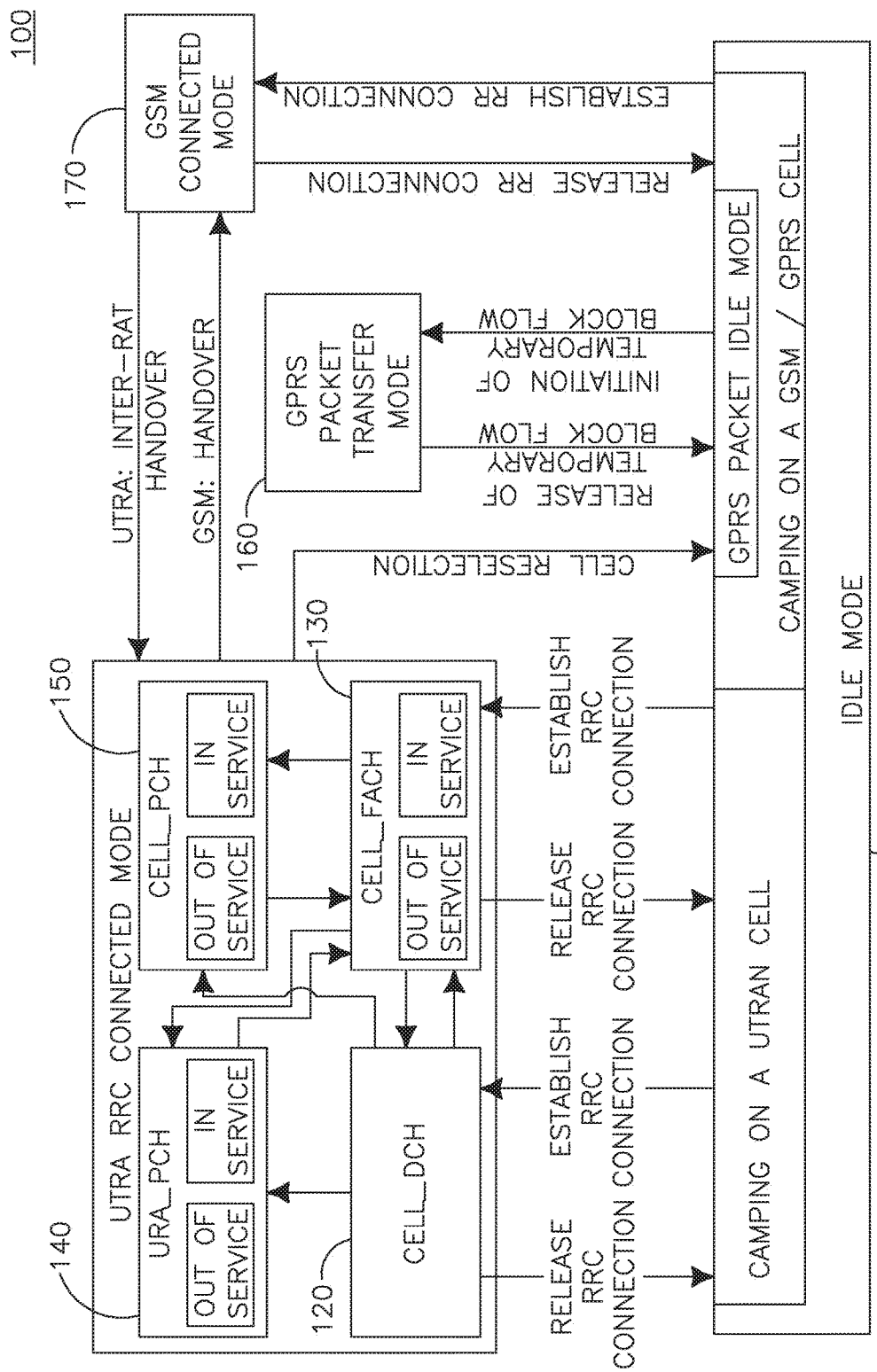
FIG. 1 shows the RRC states with high speed downlink packet access (HSDPA)/high speed uplink packet access (HSUPA)
Figure 2:
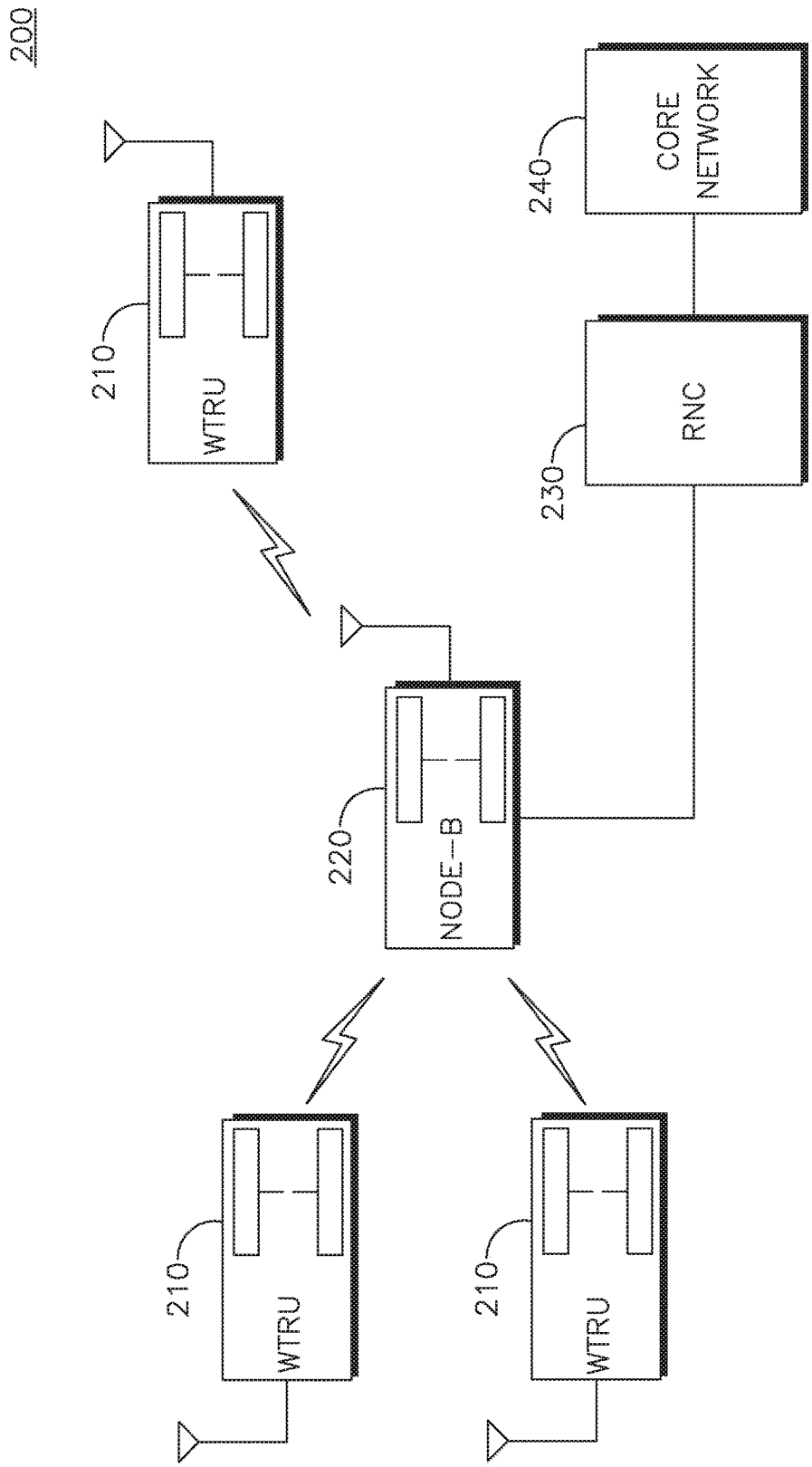
FIG. 2 is an exemplary wireless communication system including a plurality of wireless transmit/receive units (WTRUs), a Node-B, a radio network controller (RNC), and a core network.

FIG. 2 shows a wireless communication system 200 including a plurality of WTRUs 210, a Node-B 220, an RNC 230, and a core network 240. As shown in FIG. 2, the WTRUs 210 are in communication with the Node-B 220, which is in communication with the RNC 230, which is in communication with the core network 240. Although three WTRUs 210, one Node-B 220, and one RNC 230 are shown in FIG. 2, it should be noted that any combination of wireless and wired devices may be included in the wireless communication system 200.

Figure 3:
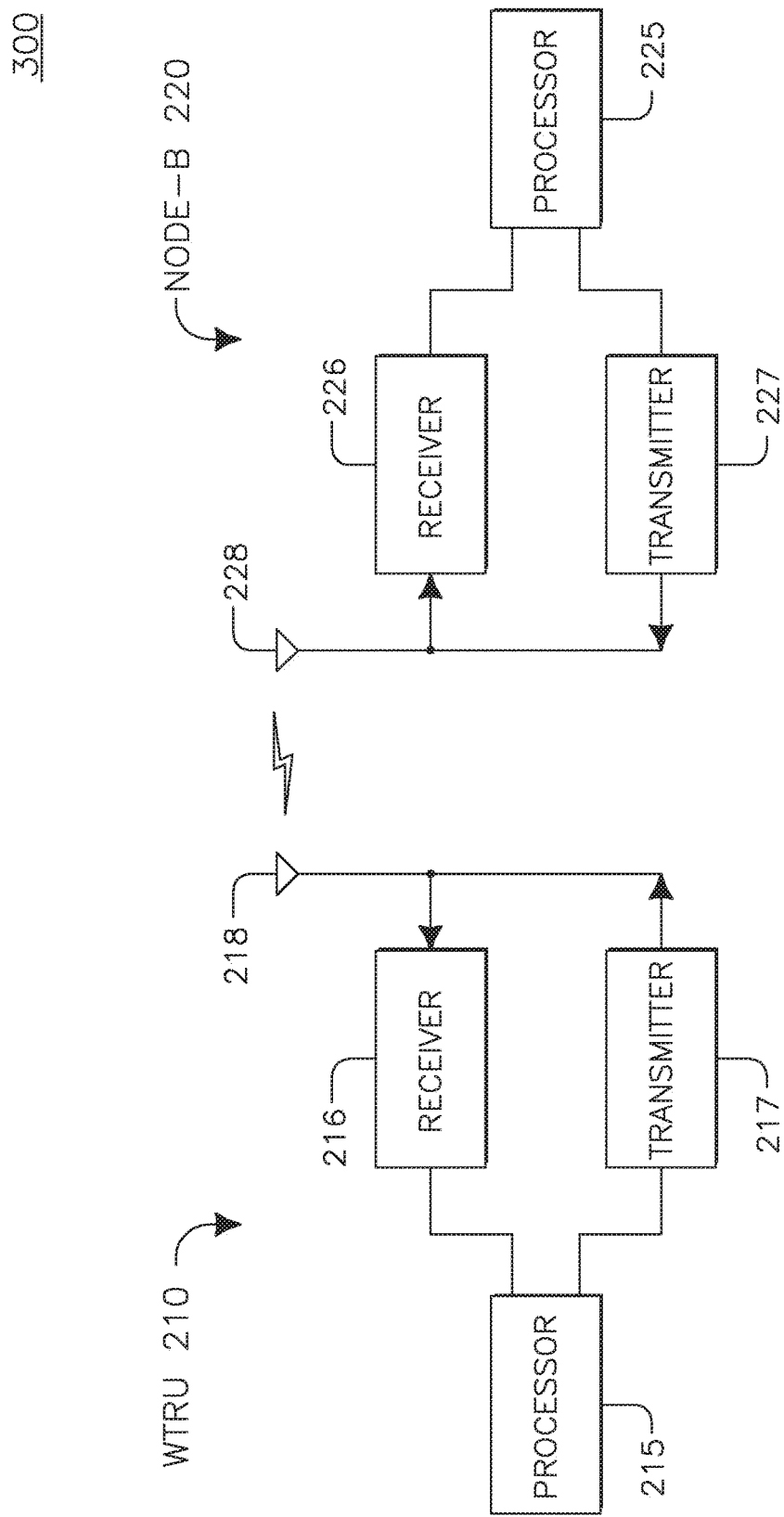
FIG. 3 is a functional block diagram of a WTRU and the Node-B of FIG. 2.

FIG. 3 is a functional block diagram 300 of a WTRU 210 and the Node-B 220 of the wireless communication system 200 of FIG. 2. As shown in FIG. 3, the WTRU 210 is in communication with the Node-B 220 and the WTRU 210 is configured to perform a method of state transition when the WTRU 210 supports E-DCH in the CELL_FACH state.

In addition to the components that may be found in a typical WTRU, the WTRU 210 includes a processor 215, a receiver 216, a transmitter 217, and an antenna 218. The processor 215 is configured to perform a method of state transition when the WTRU 210 supports E-DCH in the CELL_FACH state. The receiver 216 and the transmitter 217 are in communication with the processor 215. The antenna 218 is in communication with both the receiver 216 and the transmitter 217 to facilitate the transmission and reception of wireless data. Although one WTRU 210 antenna 218 is shown in FIG. 3, it should be noted that more than one antenna may be included in the WTRU 210.

In addition to the components that may be found in a typical Node-B, the Node-B 220 includes a processor 225, a receiver 226, a transmitter 227, and an antenna 228. The processor 225 is configured to perform a method of state transition when a cell supports E-DCH in the CELL_FACH state. The receiver 226 and the transmitter 227 are in communication with the processor 225. The antenna 228 is in communication with both the receiver 226 and the transmitter 227 to facilitate the transmission and reception of wireless data. Although one antenna 228 is shown in FIG. 3, it should be noted that more than one antenna may be included in the Node-B 220.

Figure 4:
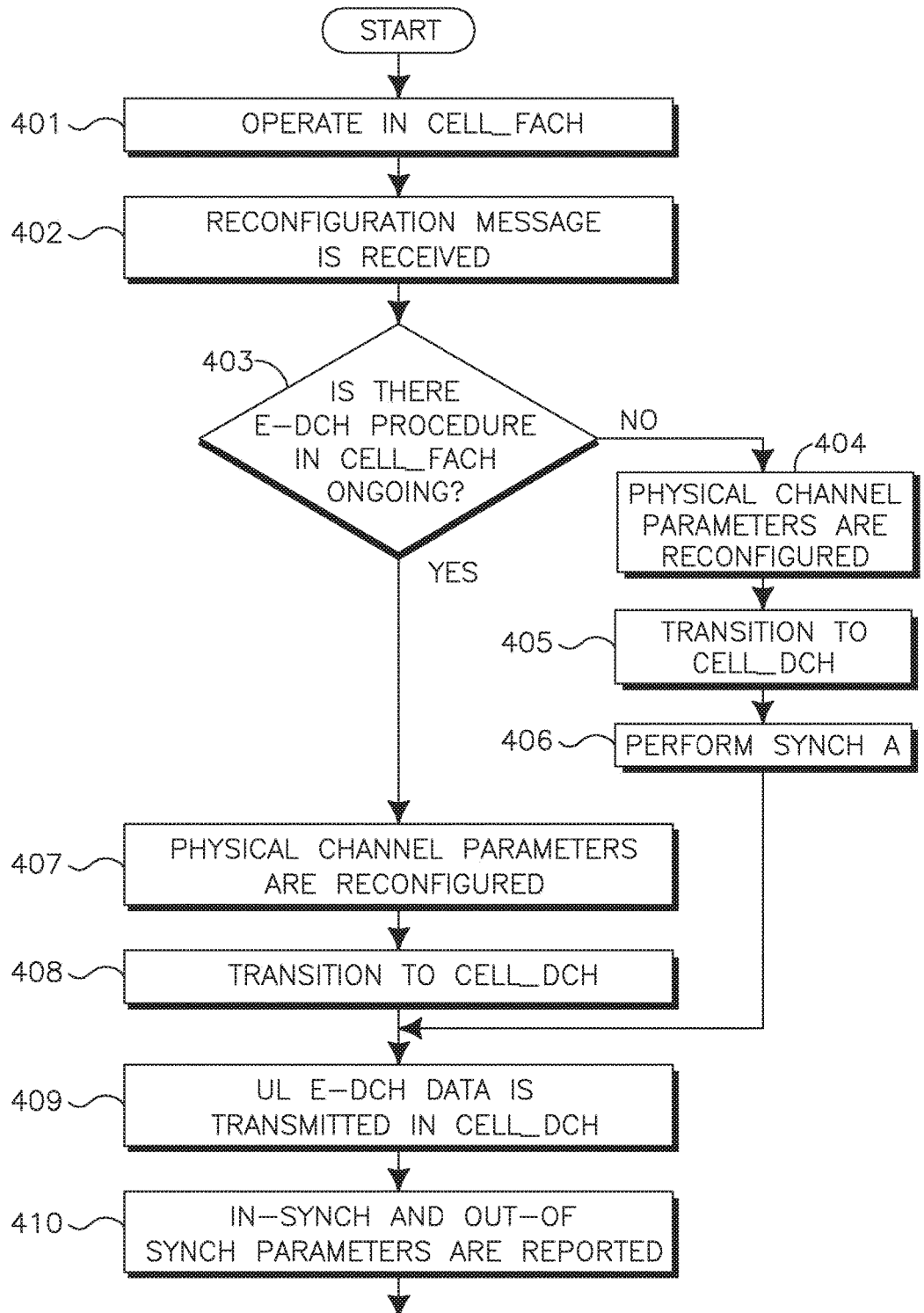
FIG. 4 shows a flow diagram for a transition from the CELL_FACH state to the CELL_DCH state.

FIG. 4 shows a flow diagram for a transition from the CELL_FACH state to the CELL_DCH state. The WTRU 210 may be configured to operate in the CELL_FACH state (401). The WTRU 210 receives a reconfiguration message indicating a reconfiguration of the WTRU 210 to the CELL_DCH state (402). The reconfiguration message may also indicate a reconfiguration of physical channel parameters. The reconfiguration message may be signaled, for example, via a cell update confirm message or through reception of an RRC reconfiguration message. The WTRU 210 determines whether it has an ongoing E-DCH procedure in the CELL_FACH state (403). If the WTRU 210 has an ongoing E-DCH procedure in the CELL_FACH state, E-DCH resources will already have been assigned to the WTRU 210. If the WTRU 210 has an ongoing E-DCH procedure, reconfigure the physical channel parameters based on the reconfiguration message (407). The WTRU 210 transitions to the CELL_DCH state (408). If an E-DCH procedure is ongoing, the WTRU 210 may be considered in-synch (i.e. in synchronization with the DL physical channels established during the E-DCH procedure in the CELL_FACH state) at the time of the state transition, because the WTRU 210 has already established an RL with the Node-B 220 at the time of the state transition. Therefore, to avoid additional delays associated with synchronization upon state transition to the CELL_DCH state, the WTRU 210 may immediately transition to the CELL_DCH state without performing synchronization procedure A. Synchronization procedure A, as defined in 3GPP TS25.214, is a synchronization procedure that may be performed when no prior RL existed before the state transition. Upon transition to the CELL_DCH state, the WTRU 210 transmits UL data via the E-DCH (409). The WTRU 210 may also transmit UL control information via the E-DCH in the CELL_DCH state. Optionally, the WTRU 210 may wait to resume UL transmissions until an activation time signaled by the network 240, or it may wait and transmit at the UL E-DCH frame boundary. The WTRU 210 may monitor radio link synchronization criteria as required in the CELL_DCH state, as defined in 3GPP TS 25.331. More specifically, the WTRU 210 may immediately move to phase 2 of the synchronization procedure A, where the WTRU 210 may report both in-synch and out-of-synch parameters (410). The WTRU 210 may report the parameters to a higher layer radio link monitoring function. The synchronization criteria may be monitored immediately after the state transition, or it may be performed after the DL physical channels are established.

If there is no ongoing E-DCH transmission in the CELL_FACH state, reconfigure the physical channel parameters (404), transition to the CELL_DCH state (405), perform Synchronization Procedure A (406), and transmit UL data (409). The WTRU 210 receives an enhanced radio network temporary identifier (E-RNTI) assignment from the network 240 and may set an E_RNTI variable based on the assignment, which is used to reduce delays associated with UL data transmission. The WTRU 210 may be configured to keep the variable E_RNTI used in the CELL_FACH state. Optionally, if a new E-RNTI assignment is received, the WTRU 210 may reconfigure the variable E_RNTI to the assigned E-RNTI value. The WTRU 210 may reset the medium access control (MAC)-i/is entity. The reset may be performed autonomously upon the state transition. Optionally, the reset may be explicitly indicated by an RRC reconfiguration message via a MAC-i/is reset indicator.

Upon transitioning to the CELL_DCH state, the WTRU 210 may be configured to set an initial UL transmit power level for transmission in the CELL_DCH state. The WTRU 210 may set the initial UL transmit power to the same UL transmit power used by the WTRU 210 prior to transitioning to the CELL_DCH state. Alternatively, the WTRU 210 may obtain the initial UL transmit power from a power offset, $\Delta dB$, which is configured by the network 240. The WTRU 210 may apply the power offset to the power used by the WTRU 210 in the CELL_FACH state prior to transitioning to the CELL_DCH state.

Alternatively, when transitioning to the CELL_DCH state, the WTRU 210 may be configured to perform Synchronization Procedure B only. Synchronization Procedure B, as defined in 3GPP TS 25.214, is a synchronization procedure that may be performed when one or more RLs are added to the active set and at least one of the RLs that existed prior to the state transition still exist after the state transition. Upon transitioning to the CELL_DCH state, the WTRU 210 may be configured to set an initial UL transmit power for transmission in the CELL_DCH state. The WTRU 210 may set the initial UL transmit power to the same UL transmit power used by the WTRU 210 prior to transitioning to the CELL_DCH state. Alternatively, the WTRU 210 may obtain the initial UL transmit power from a power offset, $\Delta dB$, which is configured by the network 240. The WTRU 210 may apply the power offset to the power used by the WTRU 210 in the CELL_FACH state prior to transitioning to the CELL_DCH state.

Alternatively, the WTRU 210 may be configured to perform Synchronization Procedure A only, and the initial UL transmit power may be configured to be the same UL transmit power used by the WTRU 210 in the CELL_FACH state prior to transitioning to the CELL_DCH state. Alternatively, the WTRU 210 may obtain the initial UL transmit power from a power offset, MB, which is configured by the network 240. The WTRU 210 may apply the power offset to the power used by the WTRU 210 in the CELL_FACH state prior to transitioning to the CELL_DCH state.

The WTRU 210 may be configured to use a serving grant, which may be configured to be below a certain value during the synchronization procedure, if a synchronization procedure is executed. Alternatively, no synchronization procedure is executed, but the serving grant of the WTRU 210 is configured to be below a certain value during a pre-determined period of time after physical reconfiguration. The maximum value of the serving grant in either case may be signaled by higher layers, for example, signaled by the RRC through system information blocks (SIB)s, or signaled in a reconfiguration message. Alternatively, the Node-B 220 may refrain from issuing a serving grant above the maximum value during the pre-determined period of time, which may be signaled by higher layers.

A WTRU 210 may be in one of four UL transmission modes in the CELL_FACH state when it receives a state transition message. The UL transmission modes may be defined as follows: a) the WTRU 210 is not transmitting E-DCH transmissions; b) the WTRU 210 is transmitting PRACH preambles; c) the WTRU 210 is performing a collision resolution; and d) the WTRU 210 is transmitting E-DCH transmissions, following a collision resolution. The WTRU 210 behavior may be specified for each of these modes. In addition, the WTRU 210 behavior may be specified if the network 240 requests an immediate transition (i.e. an activation time="now"), or optionally if the network 240 requests a transition at a future activation time.

When the WTRU 210 is in the mode of not transmitting E-DCH transmissions and a state transition message is received, the WTRU 210 may be configured to perform the actions as defined in 3GPP release 7 and earlier. If a future activation time is specified, the WTRU 210 may optionally prevent any RACH or E-RACH access attempts until the future activation time.

When the WTRU 210 is in the mode of sending PRACH preambles and a state transition message is received, the WTRU 210 may be configured to terminate its E-DCH transmission attempt. If a future activation time is specified, the WTRU 210 may optionally make a decision whether or not to continue with the E-RACH access based on a combination of any of the following: logical channel, amount of data to transmit, and time until state transition is to take effect. Alternatively, the WTRU 210 may continue with E-DCH transmission if after transmitting the last preamble, prior to receiving the reconfiguration message, it receives a positive acknowledgment on the acquisition indicator channel (AICH) or a resource assignment on the E-DCH AICH (E-AICH). The WTRU 210 may wait a period of time (TP-a) prior to deciding to terminate E-RACH access. TP-a, as defined in 3GPP TS25.214, is a period of time from the transmission of a preamble to the time when the WTRU 210 expects to receive an AICH response. If the WTRU 210 does not receive either a resource assignment or an acknowledgment, the WTRU 210 may not continue E-RACH access.

When a WTRU 210 is in the mode of performing a collision resolution and a state transition message is received, the WTRU 210 may be configured to terminate its E-RACH access attempt. At the time of the state transition, the WTRU 210 may flush the HARQ buffers, or optionally, perform a MAC-i/is reset. If a future activation time is specified, the WTRU 210 may optionally make a decision whether or not to continue with the E-DCH transmission based on a combination of any of the following: logical channel, amount of data to transmit, and time until state transition is to take effect.

When the WTRU 210 is in the mode of transmitting an E-DCH transmission, after collision resolution, and a state transition message is received, the WTRU 210 may be configured based on a specified activation time.

When the activation time is set to "now", the WTRU 210 may be performing ongoing HARQ processes. The WTRU 210 may be configured to complete retransmissions for the ongoing HARQ processes. The WTRU 210 may retain the E-DCH resource, including an UL scrambling code, until all retransmissions have been completed. The WTRU 210 may refrain from initiating any new HARQ processes on the E-DCH resource and may refrain from transmitting any new data. The transition to the CELL_DCH state may be made either after the last protocol data unit (PDU) is transmitted successfully, or after all retransmissions have been attempted. The WTRU 210 may then signal the network 240 that it is capable of transitioning to the new E-DCH resource. The signal may be transmitted by a layer 1 or layer 2 message. Before ordering a state transition, the network 240 waits to receive this signal or waits until the E-DCH resources are released from the network 240, for example, via explicit signaling, or based on the expiration of a timer. Optionally, the WTRU 210 does not inform the network 240 that it is capable of transitioning to a new state, but rather transitions as soon as it completes the HARQ transmissions.

When a future activation time is specified, the WTRU 210 may be configured to continue using the E-DCH resource until that activation time is reached. The WTRU 210 may prevent all new transmissions up until the activation time, or optionally, it may mark a window before the activation time as unavailable for starting new transmissions. The size of the window may be specified, configured by the network 240, or determined by the WTRU 210 as a function of the maximum time it would take to transmit a new PDU, including maximum retransmissions. For example, if the maximum time to complete a transmission of a new PDU is greater than the time remaining prior to the expiration of the activation time, the WTRU 210 may not allow the new transmission. The WTRU 210 may also base the decision whether or not to start a new transmission on any combination of the following: the logical channel, the amount of data to transmit, and the time until state transition is to take effect.

At the time of the state transition, the WTRU 210 may be configured to flush all HARQ buffers for PDUs that are not involved in ongoing HARQ processes, but may continue active HARQ process transmissions. The active HARQ processes may be transmitted using an interim E-DCH configuration, and may prevent any new transmissions until the active HARQ processes terminate. Alternatively, if the HARQ process configuration parameters are the same as for the E-DCH HARQ processes, the WTRU 210 may continue transmission of the HARQ processes in the CELL_DCH state seamlessly without having to perform a MAC-i/is reset or flush the HARQ buffers.

For the DL, the WTRU 210 may configure the new DL channels as specified in the state transition message. For the UL, the WTRU 210 may only change the scrambling code. The WTRU 210 may continue to use all other E-DCH configuration parameters associated to the E-RACH resource. When the last PDU has been either acknowledged or retransmitted the maximum number of times, the WTRU 210 may transition to the new UL configuration. The WTRU 210 may need to signal the network 240 that is has transitioned to the new UL E-DCH resource. The signal may be transmitted by a layer 1 or layer 2 message.

Alternatively, the WTRU 210 may be configured to perform the state transition at a given activation time. The given activation time can be set to "now" or any value determined by the network 240.

At the time of the transition, the WTRU 210 may perform one or a combination of the following: flush the HARQ buffers; only flush the HARQ buffers if the HARQ configuration (i.e. the number of HARQ processes, the HARQ memory allocation, or the transmission time interval (TTI) value) changes; reset the MAC-ids entity or alternatively refrain from resetting the MAC-i/is entity. The transmission sequence number (TSN) may be maintained as long as the MAC-i/is entity in the serving RNC (S-RNC) remains unchanged. Optionally, the reset of the MAC-i/is entity may only be performed if there is an explicit MAC-i/is reset indicator in the RRC reconfiguration message.

Figure 5:
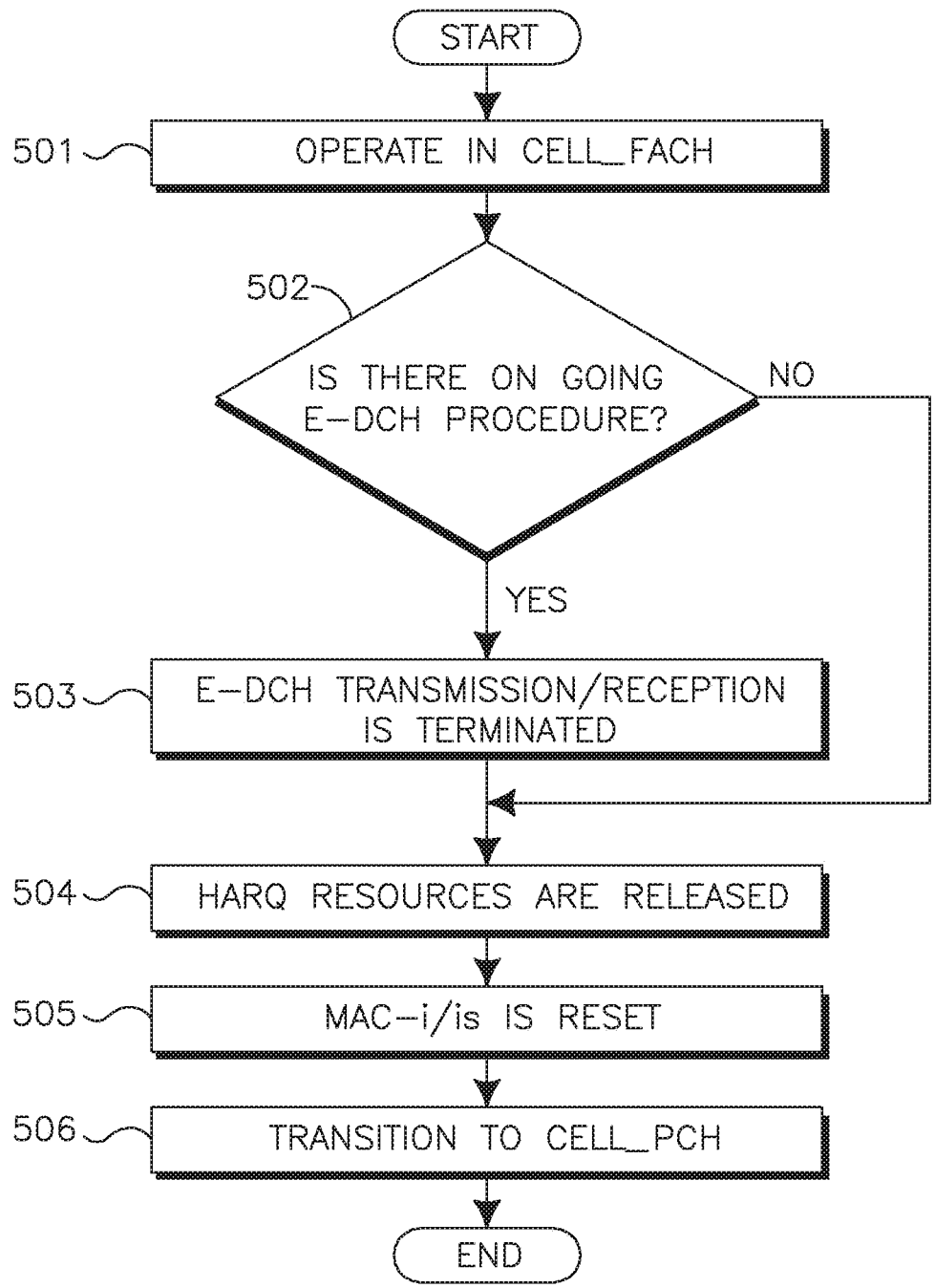
FIG. 5 shows a flow diagram for a transition from the CELL_FACH state to the CELL_PCH state.

FIG. 5 shows a flow diagram for a transition from the CELL_FACH state to the CELL_PCH state. The WTRU 210 may be configured to operate in the CELL_FACH state (501). The WTRU 210 determines if there is an ongoing E-DCH procedure (502). The E-DCH procedure may include one of E-DCH transmission procedures or E-DCH reception procedures, or both procedures. E-DCH transmission procedures may include E-DPDCH, DPCCH, or E-DPCCH transmission. E-DCH reception may include E-AGCH, E-HICH, or E-RGCH reception. If there is an ongoing E-DCH procedure, terminate any E-DCH transmission procedures and reception procedures which are occurring (503). The WTRU 210 releases HARQ resources (504), resets the MAC-i/is entity (505), and transitions to the CELL_PCH state (506). If there is no ongoing E-DCH procedure, the WTRU 210 releases HARQ resources (504), resets the MAC-i/is entity (505), and transitions to the CELL_PCH state (506).

Figure 6:
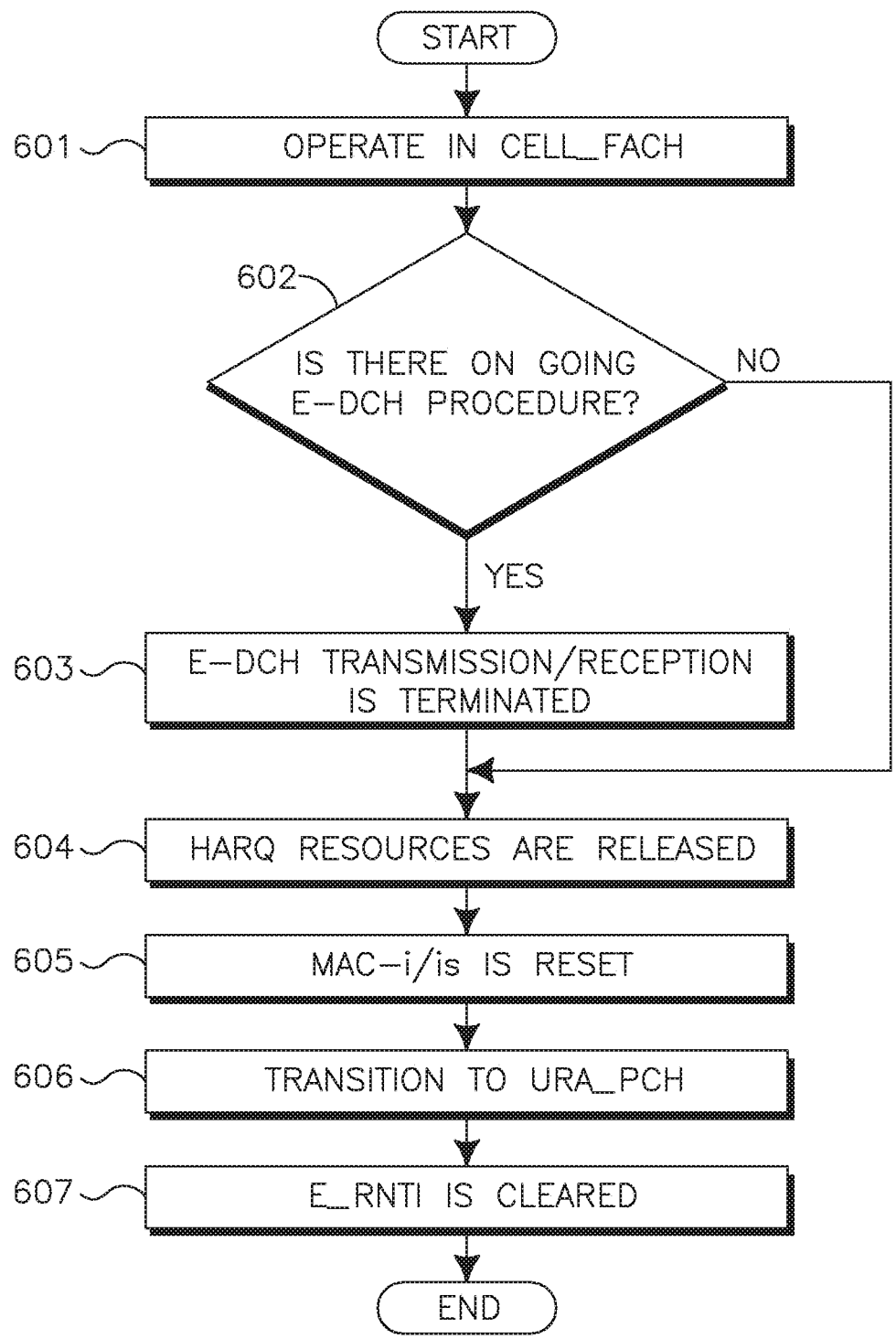
FIG. 6 shows a flow diagram for a transition from the CELL_FACH state to the URA_PCH state.

FIG. 6 shows a flow diagram for a transition from the CELL_FACH state to the URA_PCH state. The WTRU 210 may be configured to operate in the CELL_FACH state (601). The WTRU 210 determines if there is an ongoing E-DCH procedure (602). The E-DCH procedure may include one of E-DCH transmission procedures or E-DCH reception procedures, or both procedures. E-DCH transmission procedures may include E-DPDCH, DPCCH, or E-DPCCH transmission. E-DCH reception procedures may include E-AGCH, E-HICH, or E-RGCH reception. If there is an ongoing E-DCH procedure, terminate any E-DCH transmission procedures and reception procedures which are occurring (603). The WTRU 210 releases HARQ resources (604). Alternatively, the WTRU 210 may be configured to maintain HARQ resources. The WTRU 210 resets the MAC-i/is entity (605). Optionally, the WTRU 210 may be configured to maintain the MAC-i/is entity. The WTRU 210 transitions to the URA_PCH state (606), and clears the E_RNTI variable (607). Alternatively, the WTRU 210 may maintain the variable E_RNTI. Alternatively, the WTRU 210 may receive a primary E-RNTI value and a secondary E-RNTI value from the Node B 220, and may maintain the primary E-RNTI value only, while clearing the secondary E-RNTI value. If there is no ongoing E-DCH procedure, the WTRU 210 releases HARQ resources (604), resets the MAC-i/is entity (605), transitions to the URA_PCH state (606), and clears the E_RNTI variable (607).

Figure 7:
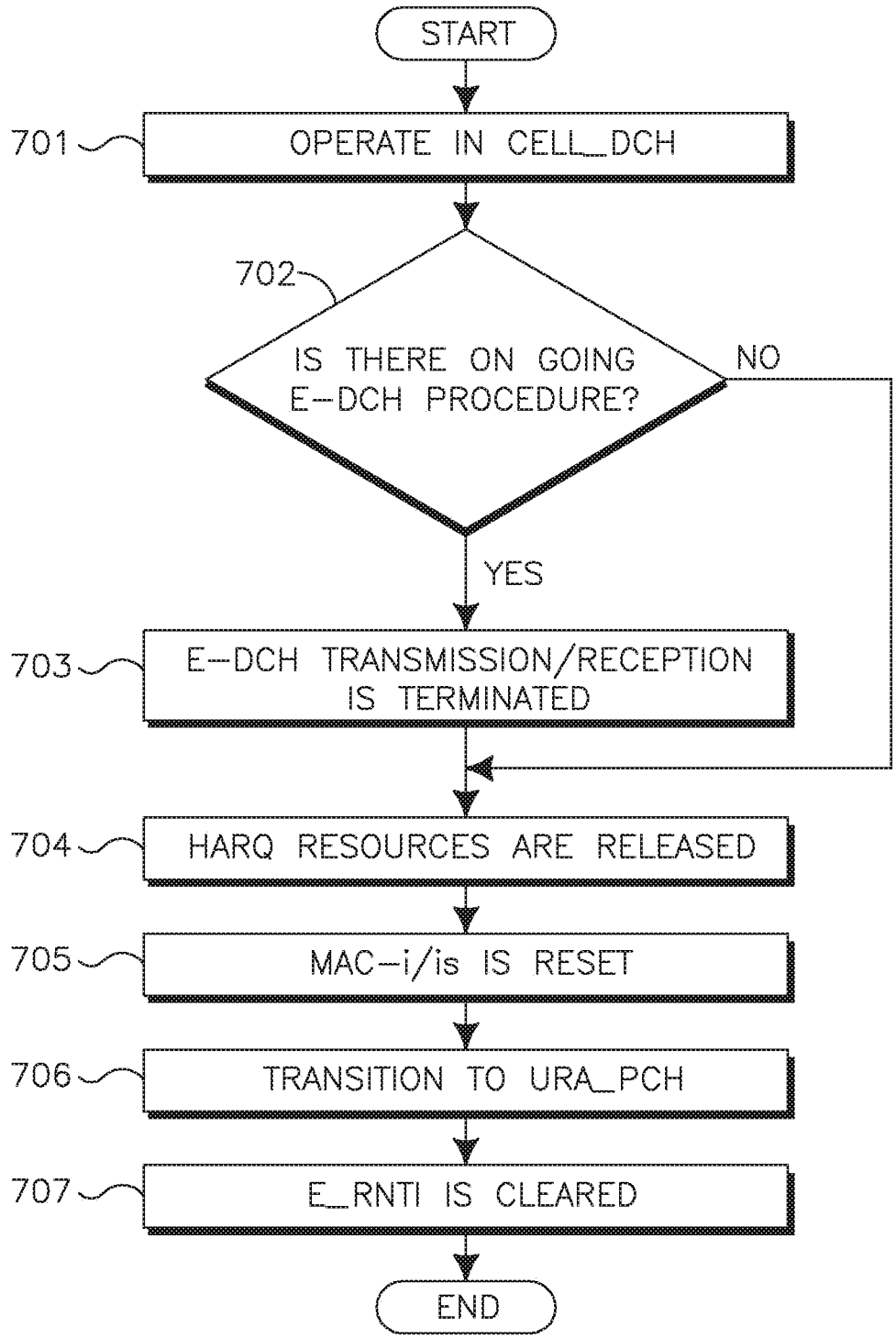
FIG. 7 shows a flow diagram for a transition from the CELL_DCH state to the URA_PCH state.

FIG. 7 shows a flow diagram for a transition from the CELL_DCH state to the URA_PCH state. The WTRU 210 may be configured to operate in the CELL_DCH state (701). The WTRU 210 determines if there is an ongoing E-DCH procedure (702). The E-DCH procedure may include one of E-DCH transmission procedures or E-DCH reception procedures, or both procedures. E-DCH transmission procedures may include E-DPDCH, DPCCH, or E-DPCCH transmission. E-DCH reception procedures may include E-AGCH, E-HICH, or E-RGCH reception. If there is an ongoing E-DCH procedure, terminate any E-DCH transmission procedures and reception procedures which are occurring (703). The WTRU 210 releases HARQ resources (704). Alternatively, the WTRU 210 may be configured to maintain HARQ resources. The WTRU 210 resets the MAC-i/is entity (705). Optionally, the WTRU 210 may be configured to maintain the MAC-i/is entity. The WTRU 210 transitions to the URA_PCH state (706) and clears the E_RNTI variable (707). Alternatively, the WTRU 210 may be configured to maintain the variable E_RNTI. Alternatively, the WTRU 210 may be configured to receive a primary E-RNTI value and a secondary E-RNTI value from the Node B 220, and may maintain the primary E-RNTI value only, while clearing the secondary E-RNTI value. If there is no ongoing E-DCH procedure, the WTRU 210 releases HARQ resources (704), resets the MAC-i/is entity (705), transitions to the URA_PCH state (706), and clears the E_RNTI variable (707).

Allowing the E_RNTI variable, MAC-i/is entity, and HARQ resources to be maintained while in the CELL_PCH state may allow the WTRU 210 to perform a faster transition to the CELL_FACH state in the case of UL transmission of messages other than the common control channel (CCCH).

Figure 8:
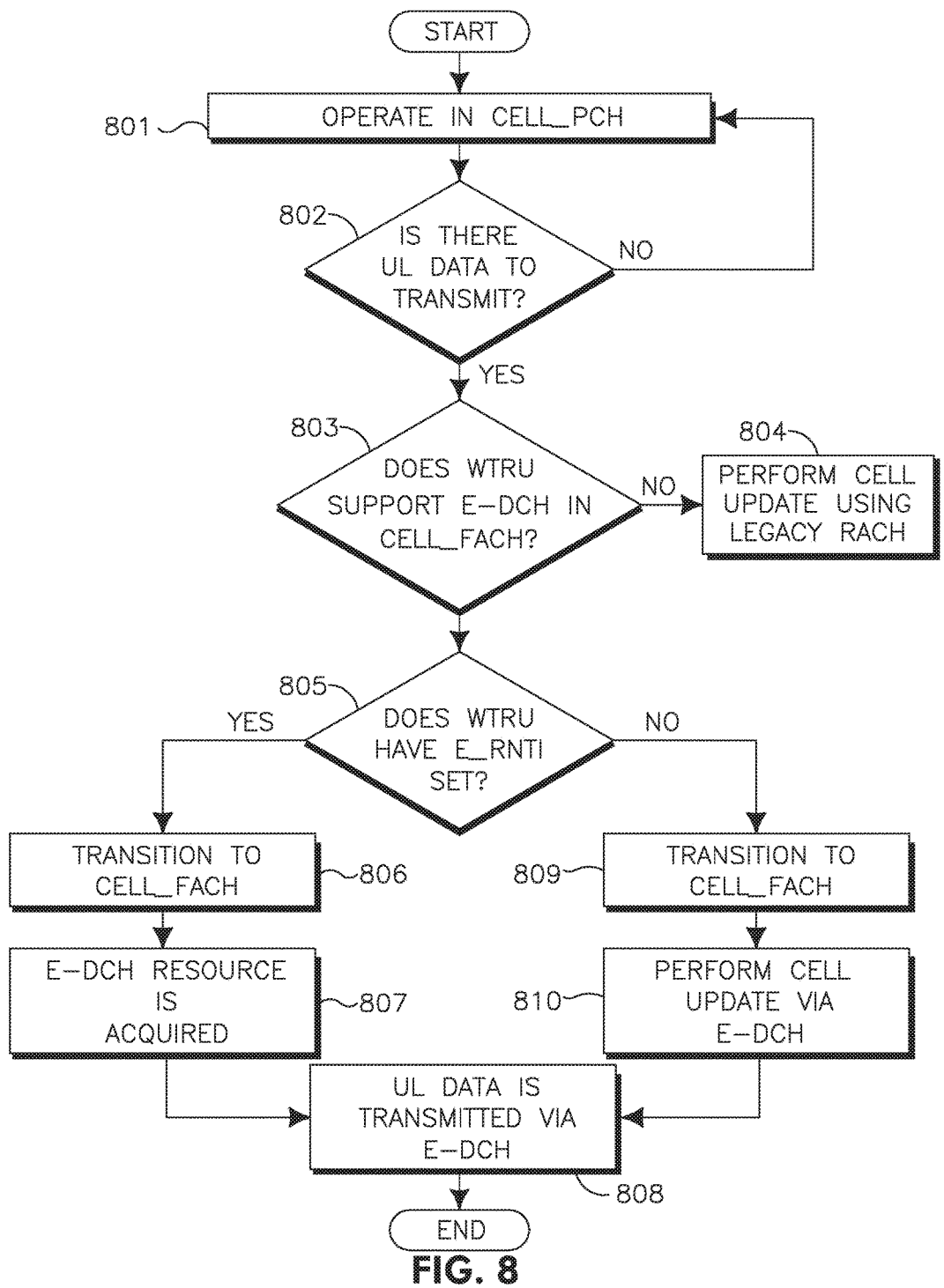
FIG. 8 shows a flow diagram for a transition from the CELL_PCH state to the CELL_FACH state.

FIG. 8 shows a flow diagram for a transition from the CELL_PCH state to the CELL_FACH state. The WTRU 210 may be configured to operate in the CELL_PCH state (801). The WTRU 210 determines whether there is UL data to transmit (802). If there is no UL data to transmit, the WTRU 210 remains in the CELL_PCH state, unless informed otherwise by the network 240. If there is UL data to transmit, determine if the WTRU 210 supports E-DCH transmission in the CELL_FACH state (803). If the WTRU 210 does not support E-DCH transmission in the CELL_FACH state, then the WTRU 210 performs a cell update via the legacy RACH as defined in 3GPP TS25.331, pre-release 8 (804). If the WTRU 210 supports E-DCH transmission in the CELL_FACH state, then the WTRU 210 determines if the E_RNTI variable is set (805). The WTRU 210 receives an E-RNTI assignment from the network 240 and may set an E_RNTI variable based on the assignment, which is used to reduce delays associated with UL data transmission. If the E_RNTI variable is set, then transition to the CELL_FACH state (806). The WTRU 210 acquires a shared E-DCH resource in the CELL_FACH state for UL transmission (807), and transmits UL data via the E-DCH (808). Delays associated with UL transmission are reduced since the WTRU 210 transitions to the CELL_FACH state and may immediately initiate UL data transmission, without having to start a cell update procedure. Optionally, if the variable E_RNTI was cleared while the WTRU 210 was in the CELL_FACH state and the WTRU 210 has a cell RNTI (C-RNTI) and an HS-DSCH RNTI (H-RNTI), the WTRU 210 may be configured to use the E-RACH to start UL transmission using a common or randomly chosen E-RNTI value. If the WTRU 210 does not have an E_RNTI variable set, then transition to the CELL_FACH state (809) and perform a cell update via the E-DCH (810) before transmitting UL data (808).

The WTRU 210 may be configured to receive a preamble and acquisition indicators over the AICH from the Node-B 220. The WTRU 210 may be configured to set up the HS-DPCCH and to send channel quality indicator (CQI) feedback to the Node-B 220. The WTRU 210 may be configured to send the CQI feedback more frequently, for example, at consecutive TTIs, at the beginning of the transmission, or at a configured frequency as specified in system information blocks (SIB), or at a cycle predetermined in the WTRU 210. The WTRU 210 may be configured to include a scheduling information (SI) field in its E-DCH transmission and optionally in subsequent E-DCH transmissions.

The WTRU 210 may be configured to transition from the CELL_DCH state to the CELL_FACH state due to a radio link (RL) failure, where the WTRU 210 may perform a cell update procedure. The WTRU 210 may also be configured to transition from the CELL_DCH state to the CELL_FACH state due to an RRC reconfiguration message.

Figure 9:
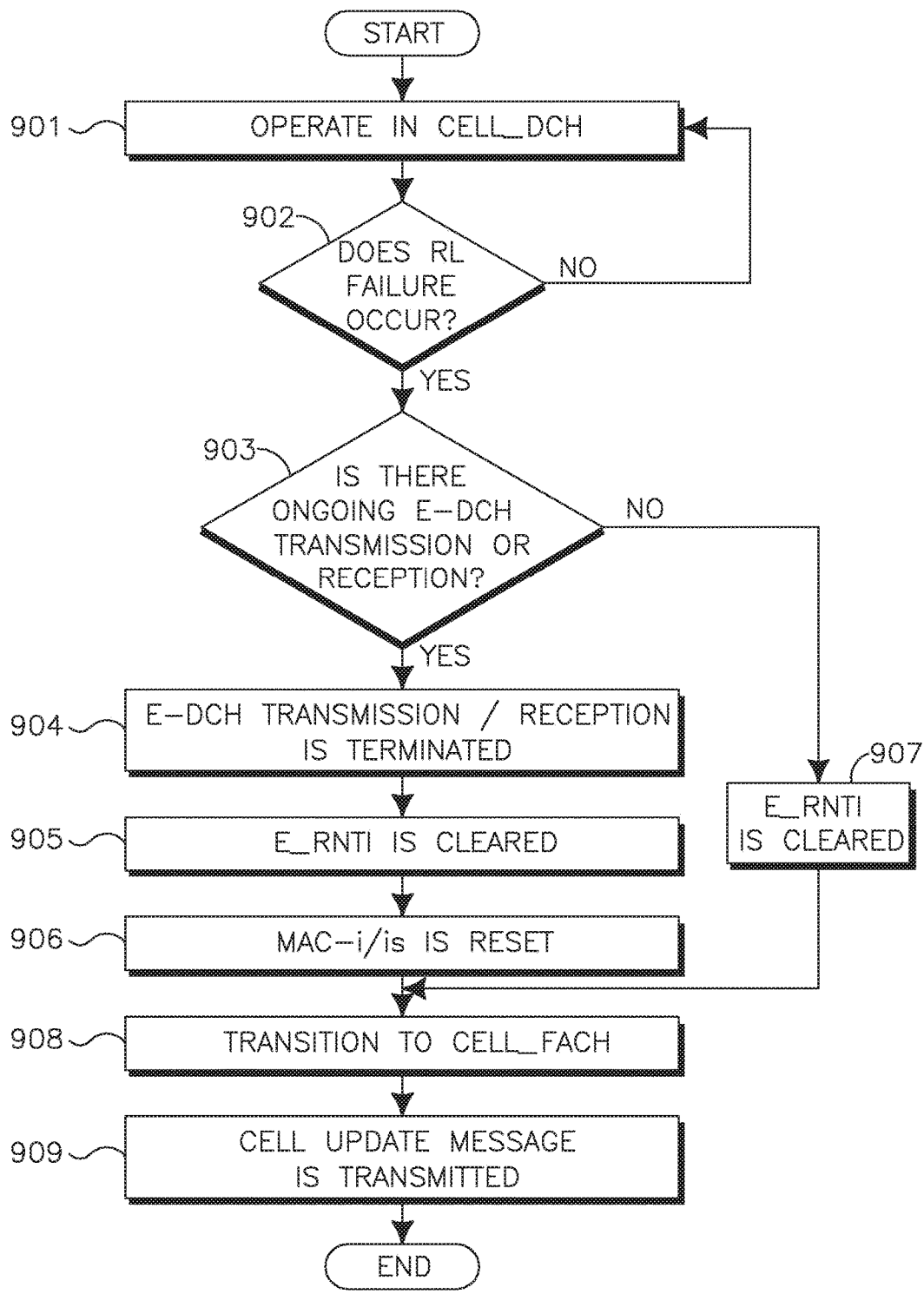
FIG. 9 shows a flow diagram for a transition from the CELL_DCH state to the CELL_FACH state, due to a radio link failure.

FIG. 9 shows a flow diagram for a transition from the CELL_DCH state to the CELL_FACH state. The WTRU 210 may be configured to operate in the CELL_DCH state (901). The WTRU 210 determines if an RL failure occurs (902). If an RL failure does not occur, the WTRU 210 remains in the CELL_DCH state, unless otherwise configured by an RRC message. If an RL failure occurs, the WTRU 210 determines if there are any E-DCH transmission procedures or E-DCH reception procedures occurring (903). E-DCH transmission may include E-DPDCH, DPCCH, or E-DPCCH transmissions. E-DCH reception may include E-AGCH, E-HICH, or E-RGCH reception. If there are E-DCH transmission procedures or E-DCH reception procedures ongoing, terminate those procedures (904). The WTRU 210 clears the variable E_RNTI (905). If UL dual cell or multi-cell operation is configured, the WTRU 210 may clear the E-RNTI values that are associated with a secondary cell or cells and may also terminate E-DCH transmission and E-DCH reception procedures associated with the secondary cell or cells. Optionally, the WTRU 210 may be configured to clear the variable E_RNTI only if the cell the WTRU 210 is reselecting to after the RL failure is different than the cell serving the E-DCH at the time of the RL failure. The WTRU 210 resets the MAC-i/is entity (906), transitions to the CELL_FACH state (908), and transmits a cell update message (909). If there is no E-DCH transmission or E-DCH reception procedures occurring, then clear the variable E_RNTI (907) and transition to the CELL_FACH state (908).

The WTRU 210 may be configured to perform an E-RACH access procedure in the CELL_FACH state to transmit the cell update message. As part of the E-RACH access procedure, the WTRU 210 may select a new configuration for one or more of the E-DPDCH, E-DPCCH, E-AGCH, E-HICH, or E-RGCH as part of the E-DCH RACH access procedure. Optionally, the WTRU 210 may reconfigure the E-DPDCH and E-DPCCH according to the new configuration that was selected as part of the E-RACH access procedure. Optionally, the WTRU 210 may also reconfigure the E-AGCH, E-HICH, and E-RGCH according to the new configuration that was selected as part of the E-RACH access procedure.

The WTRU 210 may be configured to transmit data blocks in intervals called transmission time intervals (TTIs). When initiating transmission over the E-DCH in the CELL_FACH state to initiate a cell update procedure due to an RL failure, the WTRU 210 may be configured to use a 10 ms TTI if the WTRU 210 was transmitting over the E-DCH using a 2 ms TTI before the RL failure. Alternatively, the WTRU 210 may transmit over the RACH as specified in 3GPP pre-Release 6.

Figure 10A:
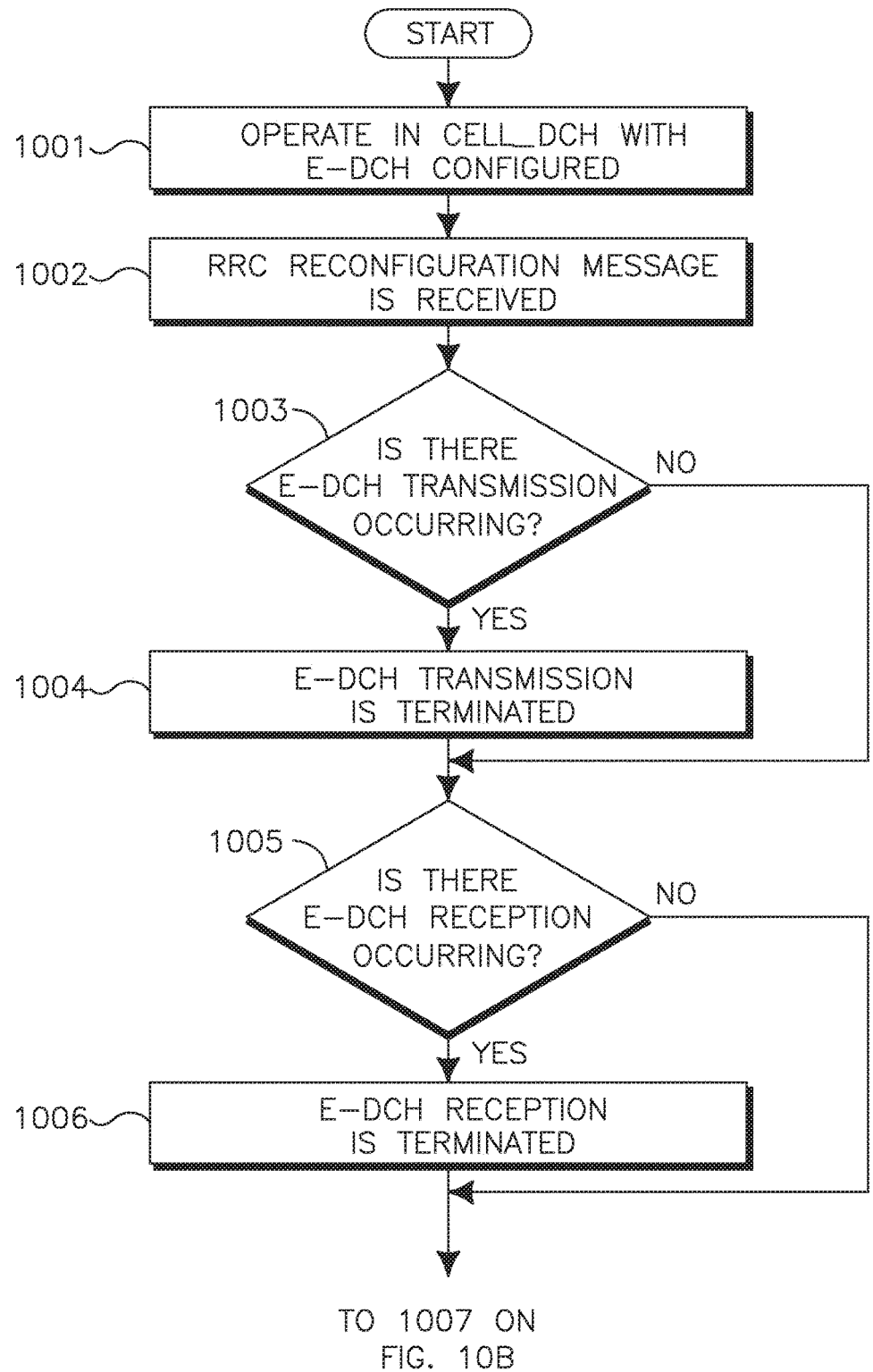
FIGS. 10A and 10B show a flow diagram for a transition from the CELL_DCH state to the CELL_FACH state, due to a radio resource control (RRC) reconfiguration message.
Figure 10B:
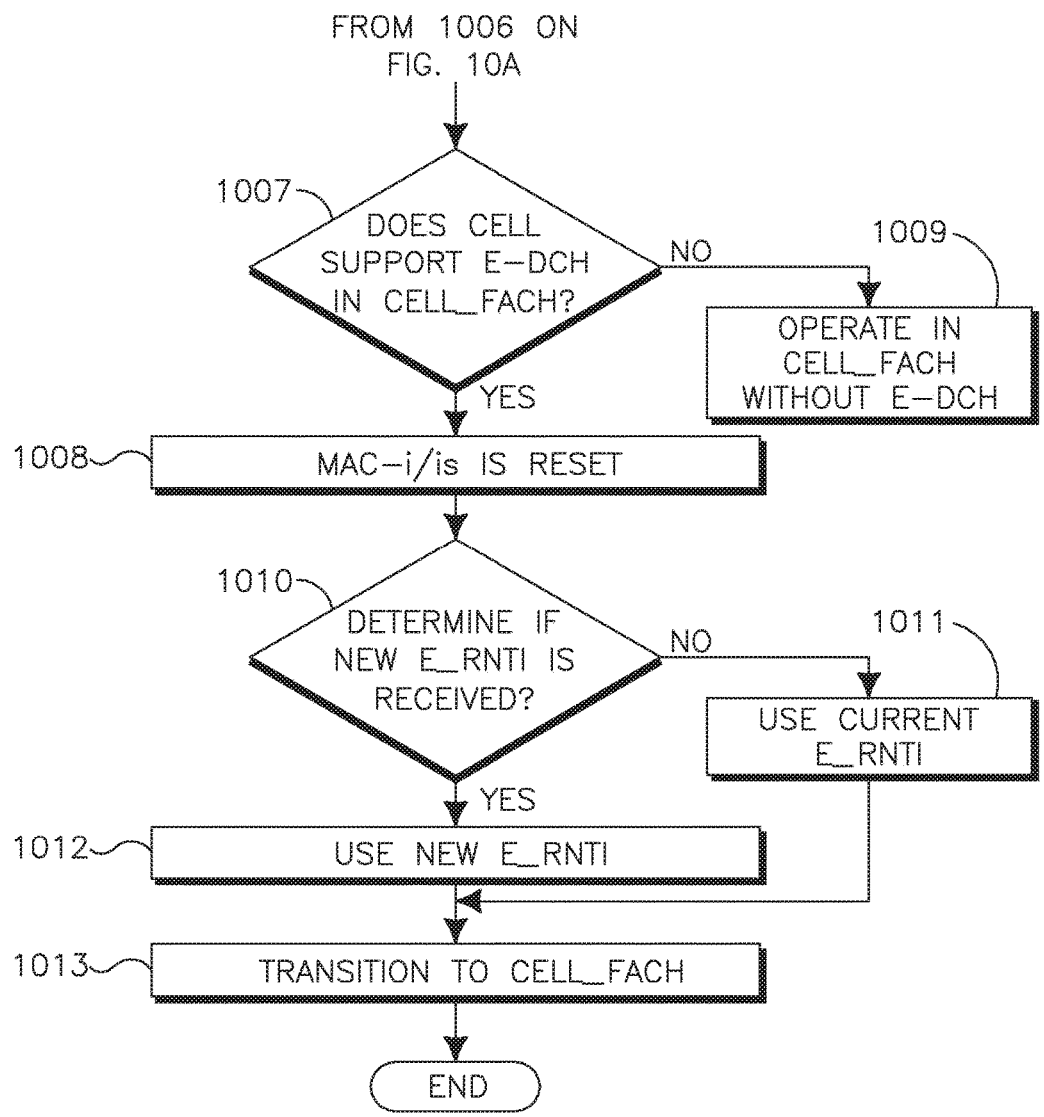

FIGS. 10A and 10B show a flow diagram for a transition from the CELL_DCH state to the CELL_FACH state. The WTRU 210 may be configured to operate in the CELL_DCH state configured with an E-DCH resource (1001). The WTRU 210 receives an RRC reconfiguration message to change to the CELL_FACH state (1002) and determines if there are E-DCH transmission procedures occurring (1003). E-DCH transmission may include E-DPDCH or E-DPCCH transmission. If there are E-DCH transmission procedures occurring, the transmission procedures are terminated (1004). The WTRU 210 determines if there are E-DCH reception procedures occurring (1005). E-DCH reception may include E-AGCH, E-HICH, or E-RGCH reception. If there are E-DCH reception procedures occurring, terminate the reception procedures (1006). The WTRU 210 determines if the cell supports E-DCH in the CELL_FACH state (1007). If the cell does not support E-DCH in the CELL_FACH state, then operate in the CELL_FACH state without E-DCH (1009). If the cell supports E-DCH in the CELL_FACH state, the WTRU 210 resets the MAC-i/is entity (1008). The reset may be performed each time the state transition occurs. Alternatively, the reset may be performed via explicit signaling from the RRC message via a MAC-i/is reset indicator. The WTRU 210 determines if a new E-RNTI assignment is received (1010). If a new E-RNTI assignment is received from the Node B 220, then operate in the CELL_FACH state with the new E-RNTI value assigned (1012). If a new E-RNTI assignment is not received, then use the current E-RNTI value. The WTRU 210 transitions to the CELL_FACH state (1013). Optionally, the WTRU 210 may be configured to flush the HARQ buffers.

The WTRU 210 may be provided contention free access over the E-RACH, to transmit an UL RRC reconfiguration complete message to the network 240, to confirm that a state transition was successful.

Figure 11:
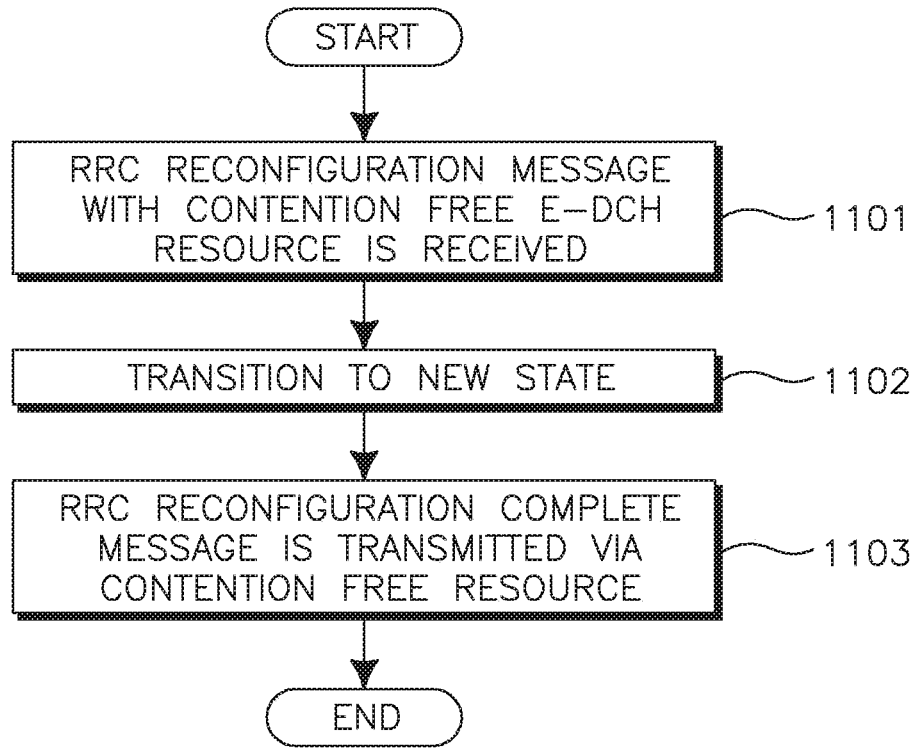
FIG. 11 shows a flow diagram for transmitting an RRC message via contention free access.

FIG. 11 shows a method for contention free access for transmitting an RRC message. The WTRU 210 may be configured to receive an RRC reconfiguration message to change to a new state such as the CELL_FACH state, the CELL_PCH state, or the URA_PCH state, wherein the message contains a contention free E-DCH resource (1101). The WTRU 210 transitions to the new state (1102) and transmits an RRC reconfiguration complete message to the network 240 using the contention free E-DCH resource (1103). The transmitted message may also be an RRC reconfiguration failure message. Optionally, the WTRU 210 may be configured to receive UL physical channel resources from a pool of broadcasted resources to be used for the contention free access transmission. The WTRU 210 may use a preamble signature sequence provided in the RRC reconfiguration message to initiate a preamble power ramping cycle to establish a pre-determined transmission power. The WTRU 210 may wait to receive an AICH message, then immediately transmit the RRC reconfiguration complete message, without having to perform a contention resolution phase.

Alternatively, the WTRU 210 may be configured to transmit the RRC reconfiguration complete message as soon as the pre-determined power is established without waiting for the AICH message. The power level used by the WTRU 210 may be the same power that the WTRU 210 was using prior to transitioning to the CELL_FACH state. Alternatively, the WTRU 210 may be configured to receive the initial power level, or a power offset, from the network 240 to start using upon transmission, relative to the power of the last transmission. Alternatively, the initial power level may be a pre-configured power level.

The WTRU 210 may be configured to receive a signal from the network 240, containing an explicit E-DCH resource, either in the form of an index to a set of broadcasted resources or a dedicated resource allocation with explicit parameters as part of an existing or new RRC message. The WTRU 210 may then be configured to initiate a synchronization procedure.

Figure 12:
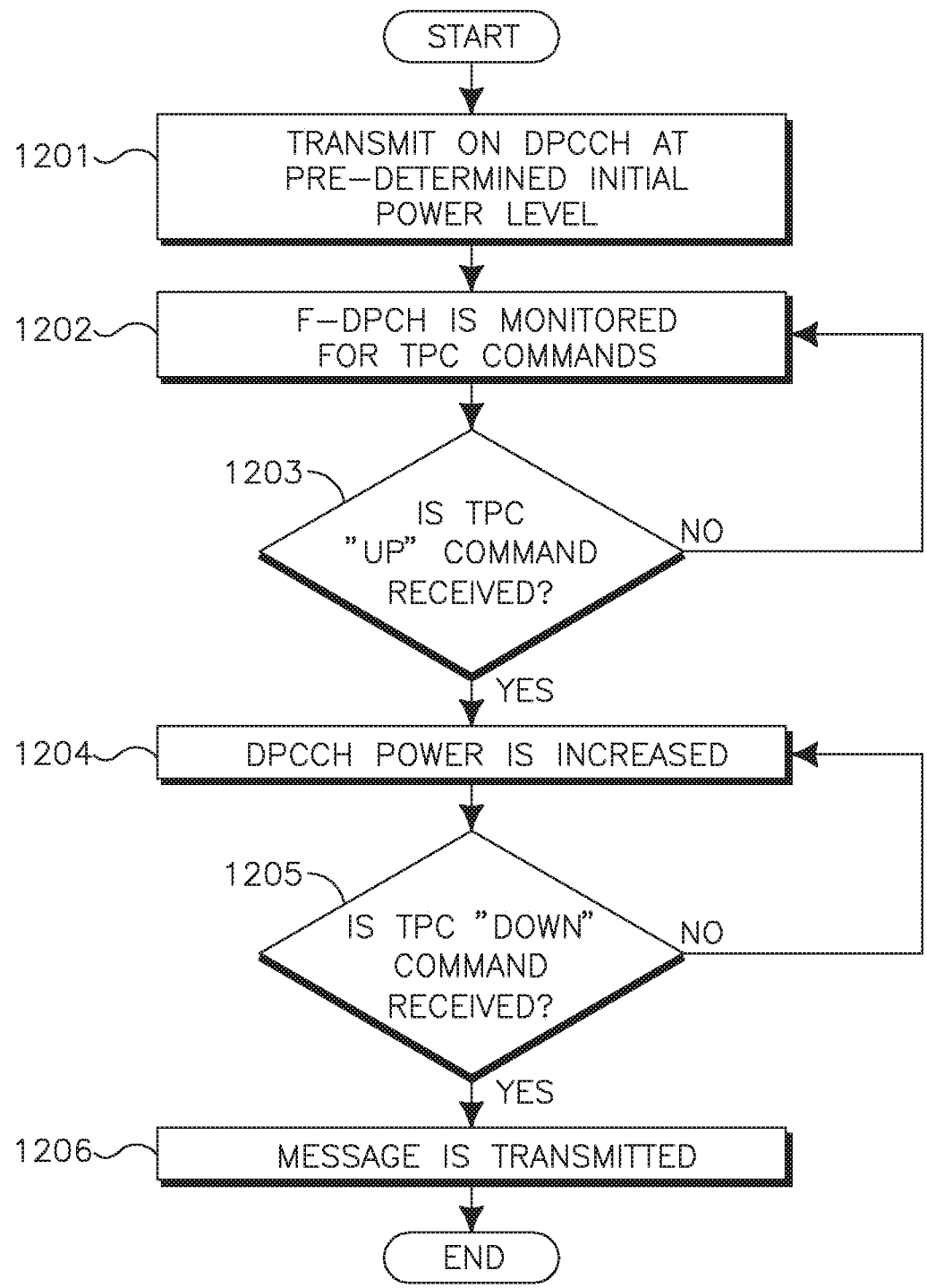
FIG. 12 shows a flow diagram of a synchronization procedure.

FIG. 12 shows a flow diagram of a synchronization procedure. The WTRU 210 may be configured to transmit on the DPCCH at a predetermined initial power level (1201). The power level may be received from the network 240 as an absolute value or as an offset with respect to the power of the previous transmission. The WTRU 210 monitors the fractional dedicated physical channel (F-DPCH) for transmit power control (TPC) commands (1202). The WTRU 210 determines whether TPC commands indicating that the power level should be increased (i.e., "up" commands) are received (1203). If up TPC commands are received, the WTRU 210 increases power on the DPCCH by a pre-determined amount (1204). If up TPC commands are not received, the WTRU 210 continues to monitor the F-DPCH for TPC commands. The WTRU 210 determines whether TPC commands indicating proper power level (i.e., "down" commands) are received on the F-DPCH (1205). If down TPC commands are received, the WTRU 210 transmits a message (1206). If down TPC commands are not received, the WTRU 210 increases the power on the DPCCH by a fixed amount (1204) and determines whether a down TPC command is received (1205).

Optionally, a longer synchronization period may be used to help stabilize the power control loop. The duration of the synchronization period may be pre-configured, signaled by the network 240 using RRC dedicated signaling, or broadcasted. Optionally, Synchronization Procedure A may also be used.

The E-DCH in the CELL_FACH state or Idle mode may also be used where the network 240 is aware that the WTRU 210 has to respond with an UL transmission in the CELL_FACH state.

Figure 13:
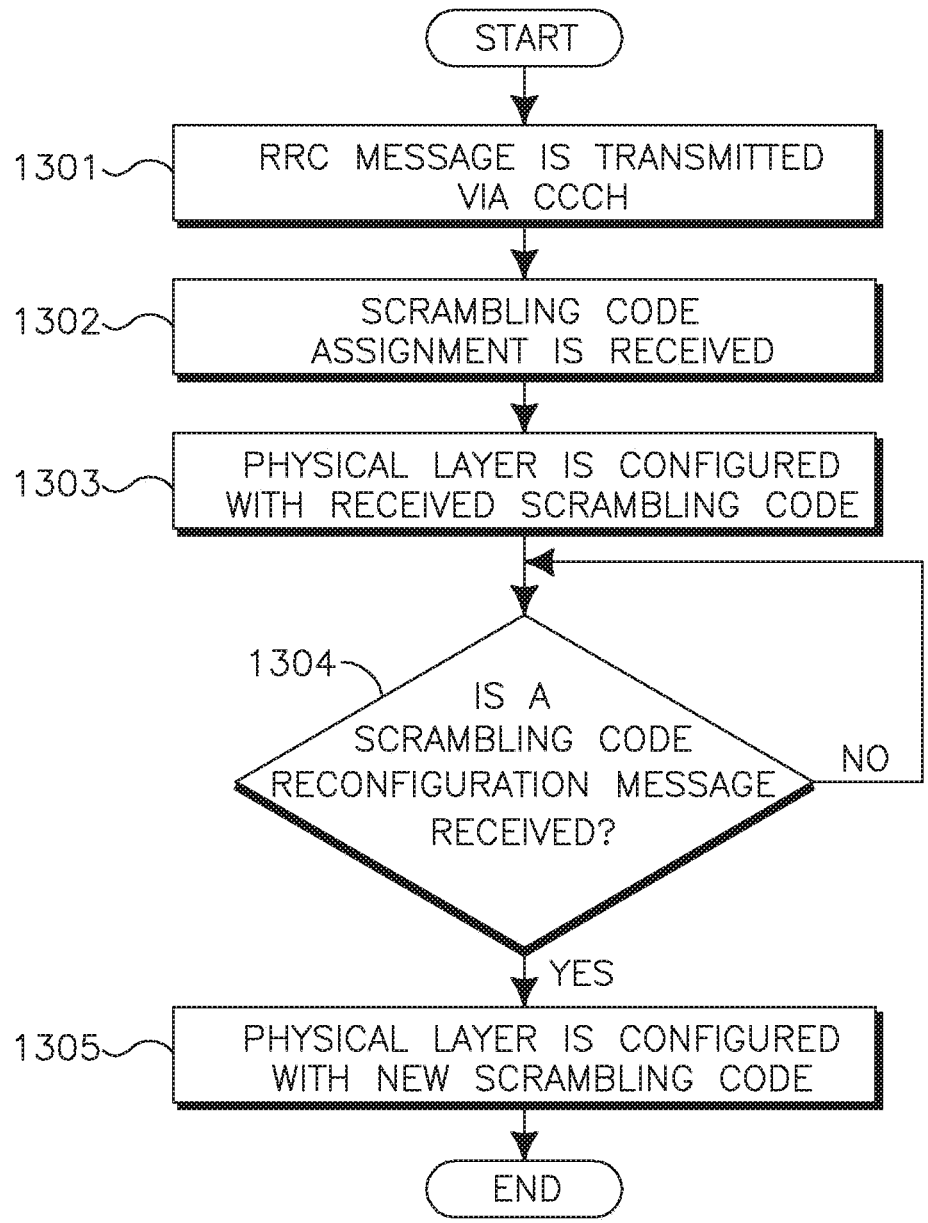
FIG. 13 shows a flow diagram of a scrambling code assignment.

FIG. 13 shows a flow diagram for a scrambling code assignment. The WTRU 210 may be configured to transmit an RRC message over the CCCH (1301). The WTRU 210 receives a scrambling code assignment from the network 240 (1302). The scrambling code assignment may be received, for example, via an RRC confirmation message or an RRC setup message. The WTRU 210 configures the physical layer with the scrambling code for UL transmissions (1303) and determines whether a message is received from the network 240 indicating a scrambling code reconfiguration (1304). If a message is received indicating a new scrambling code configuration, the WTRU 210 configures the physical layer with the new scrambling code for UL transmissions (1305). If no scrambling code reconfiguration message is received, the WTRU 210 continues with the currently configured scrambling code until a scrambling code reconfiguration message is received.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
   a transceiver;
   a processor; and
   the processor is configured to transition from a first state to a second state, wherein in the first state the WTRU does not have configured physical channels and discontinuously monitors for pages and in the second state the WTRU has configured uplink physical channels;
   the transceiver is configured to receive a signal from a network to transition to the first state; and
   the processor is configured, in response to the signal, to transition to the first state, and to store an identity and medium access control (MAC) information, wherein the stored identity and MAC information is utilized to reinitiate communication with the network.

2. The WTRU of claim 1, wherein the MAC information is MAC configuration information.

3. The WTRU of claim 1, wherein the identity is an E-RNTI.

4. The WTRU of claim 1, wherein the first state is a URA_PCH state and the second state is a CELL_FACH state.

5. A method performed by a wireless transmit/receive unit (WTRU), the method comprising:
   transitioning, by the WTRU, from a first state to a second state, wherein in the first state the WTRU does not have configured physical channels and discontinuously monitors for pages and in the second state the WTRU has configured uplink physical channels;
   receiving, by the WTRU, a signal from a network to transition to the first state; and
   transitioning, by the WTRU in response to the signal, to the first state, and to store an identity and medium access control (MAC) information, wherein the stored identity and MAC information is utilized to reinitiate communication with the network.

6. The method of claim 5, wherein the MAC information is MAC configuration information.

7. The method of claim 5, wherein the identity is an E-RNTI.

8. The method of claim 5, wherein the first state is a URA_PCH state and the second state is a CELL_FACH state.

* * * * *